Figure 1:
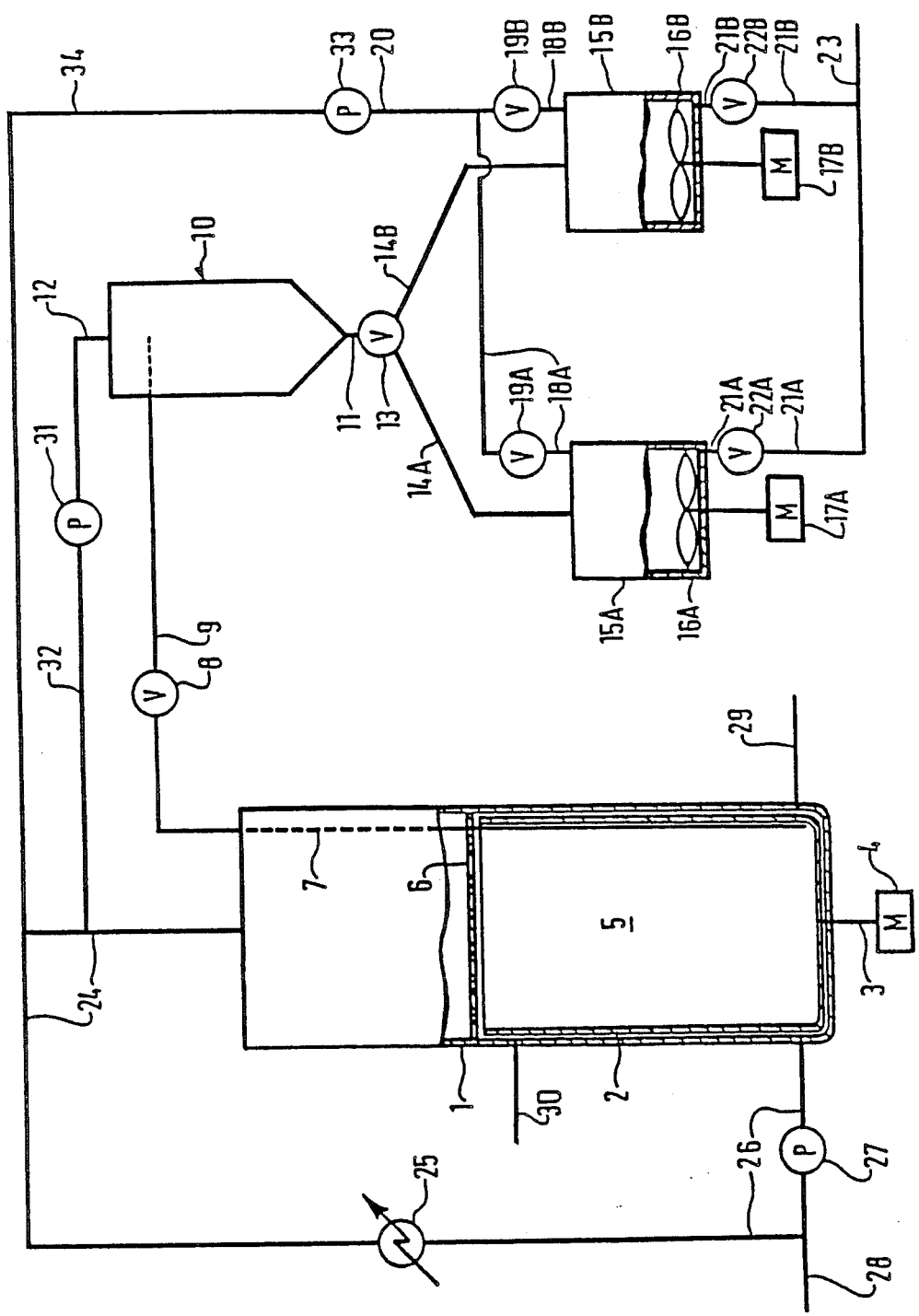

United States Patent [19]

Willmore et al.

[11] Patent Number: 4,781,896
[45] Date of Patent: Nov. 1, 1988

[54] REMOVAL OF OLEFIN MONOMER FROM OLEFIN POLYMER

[75] Inventors: Bruce A. E. Willmore, Luton; Jeffrey C. Greaves, Welwyn Garden City, both of England

[73] Assignee: Imperial Chemical Industries PLC, London, England

[21] Appl. No.: 450,433

[22] Filed: Dec. 16, 1982

Related U.S. Application Data

[60] Continuation of Ser. No. 228,201, Jan. 26, 1982, abandoned, which is a continuation of Ser. No. 86,147, Oct. 18, 1979, abandoned, which is a division of Ser. No. 40,313, May 18, 1979, abandoned, which is a continuation-in-part of Ser. No. 936,194, Aug. 24, 1978, abandoned.

[30] Foreign Application Priority Data

Jun. 13, 1978 [GB] United Kingdom ............... 7826767

[51] Int. Cl.$^4$ .............................................. B01J 8/08
[52] U.S. Cl. ................................. 422/134; 422/135; 422/234; 528/202
[58] Field of Search .............. 422/131, 134, 135, 234, 422/111, 213, 219; 528/202

[56] References Cited

U.S. PATENT DOCUMENTS

| | | | |
|---|---|---|---|
| 3,056,771 | 10/1962 | Aldridge et al. | 528/502 |
| 3,160,622 | 12/1964 | Gilbert et al. | 528/502 |
| 3,347,637 | 10/1967 | Price et al. | 422/131 |
| 3,527,741 | 9/1970 | Hattori et al. | 528/502 |
| 3,883,309 | 5/1975 | Ishizawa et al. | 422/106 |
| 4,162,894 | 7/1979 | Tribble | 422/111 |
| 4,199,546 | 4/1980 | Kirch | 422/135 |
| 4,291,132 | 9/1981 | Clifford | 422/135 |

FOREIGN PATENT DOCUMENTS 1081790 8/1967 United Kingdom .

OTHER PUBLICATIONS

Perrys'-Chemical Engineers Handbook, 4th Ed., pp. 13-49 to 13-50.
Azeotropic Data III, Horsley, p. 35, 1974.

Primary Examiner—Michael S. Marcus
Attorney, Agent, or Firm—Cushman, Darby & Cushman

[57] ABSTRACT

A solid particulate olefin polymer containing monomer(s) dissolved therein is vigorously agitated mechanically to raise the temperature of the polymer to at least 90° C. This vigorous agitation is effected in the absence of any purge gas and the unpolymerized olefin monomer desorbed from the polymer by the increase in temperature can readily be recovered and recycled to the polymerization vessel. The technique can form part of the work-up process in which the polymer is removed from the polymerization vessel and separated from unconverted monomer(s) prior to isolation. By this technique, propylene is removed from polypropylene without using a purge stream of nitrogen which makes recovery of the propylene difficult and expensive. The technique additionally heats up the polymer which can be advantageous for subsequent processing. Apparatus for effecting the process includes an agitation vessel which is connected, preferably through an intermediate separation vessel, to an olefin polymerization vessel.

1 Claim, 2 Drawing Sheets

FIG. I

REMOVAL OF OLEFIN MONOMER FROM OLEFIN POLYMER

CROSS-REFERENCE TO RELATED APPLICATIONS

This is a continuation of our earlier application Ser. No. 228,201 filed Jan. 26, 1982, now abandoned which is a continuation of our earlier application Ser. No. 86,147 filed Oct. 18, 1979, now abandoned, which is a division of our earlier application Ser. No. 40,313 filed May 18, 1979, now abandoned, which is a continuation-in-part of our earlier application Ser. No. 936,194 filed Aug. 24, 1978, now abandoned.

The present invention relates to the treatment of particulate olefin polymers to remove unpolymerised olefin monomer therefrom.

Olefin monomers such as ethylene and propylene may be polymerised by contacting a liquid or gaseous monomer or monomer mixtures, in the essential absence of any inert liquid diluent, with a solid phase which includes an active catalyst for the polymerisation of olefin monomers. The polymerisation of liquid monomers in the essential absence of an inert diluent can be carried out in any vessel suitable for effecting polymerisation in a liquid reaction medium such as a stirred vessel or a loop reactor, a vessel of the later type being described in British Patent specification No. 886 784. The gas-phase polymerisation of olefin monomers may be effected in a fluidised bed reaction vessel such as is disclosed in British patent specification Nos. 808 361 and 964 078 or U.S. Pat. No. 3,023,203, or in a stirred bed reaction vessel such as is disclosed in British patent specification No. 1 037 103.

The product of such a polymerisation process is typically a solid particulate polymer. This particulate polymer will contain small proportions of the polymerisation catalyst and also unpolymerised olefin monomer absorbed in the polymer particles. If the polymerisation catalyst is sufficiently active, the residual quantities of catalyst may be sufficiently low that they can be tolerated in the final polymer and it is then unnecessary to treat the polymer to remove harmful catalyst residues. However, since the lower olefin monomers, particularly ethylene and propylene, are volatile and inflammable, it is desirable to reduce the quantities of the absorbed olefin monomer before the polymer is exposed to the air. The removal of the absorbed monomer may be effected in a separate stage, for example using an inert sweep gas, or, if it is necessary to treat the polymer to reduce the level of potentially harmful catalyst residues in the polymer, the monomer removal and catalyst treatment may be effected in the same stage. However, using such techniques, the removed monomer is considerably diluted by the inert sweep gas or is contaminated by materials which react with the polymerisation catalyst. Thus, the removed monomer must either be rejected or must be subjected to a concentration and/or purification treatment before it can be recycled to the polymerisation reactor. Furthermore, for environmental or safety reasons, the monomer can be rejected only under carefully controlled and monitored conditions.

According to the present invention there is provided a process wherein a solid particulate olefin polymer having at least one unpolymerised olefin monomer absorbed therein is subjected to a vigorous, mechanical agitation until the temperature of the polymer has risen to at least 90° C., olefin monomer is released from the polymer and, before any substantial cooling of the polymer occurs, the released olefin monomer is separated from the polymer.

The process of the present invention can be effected by passing the olefin polymer having the olefin monomer absorbed therein into a vessel having a mechanical means to vigorously agitate a particulate solid, mechanically agitating the polymer until its temperature is at least 90° C., withdrawing from the vessel the olefin monomer released from the polymer and, without allowing any substantial cooling to occur, separating the polymer, which has a reduced content of absorbed olefin monomer, by withdrawing this polymer from the vessel separately from the monomer released from the polymer.

It will be appreciated that the process of the present invention is effected in an inert atmosphere which is substantially free from oxygen and/or oxygen-containing impurities. This inert atmosphere typically contains the monomer, or monomers, which have been evolved from the polymer with no use of a purge gas.

The olefin polymer which is subjected to the process of the present invention may be a homopolymer or may be the product of polymerising two or more olefin monomers simultaneously or in sequence, and the term "olefin polymer" is used herein to include both homopolymers and the products of such simultaneous or sequential polymerisation process. Similarly the term "polymerisation" includes not only homopolymerisation but also processes in which two or more olefin monomers are polymerised simultaneously or in sequence. It will be appreciated from the foregoing that the polymer may contain one unpolymerised olefin monomer, or several different unpolymerised olefin monomers, absorbed therein and the olefin monomer released from the polymer, and withdrawn from the vessel, may be a mixture of at least two olefin monomers.

The olefin polymer which is treated in accordance with the present invention is conveniently a product obtained by effecting polymerisation in the essential absence of an inert diluent either by using a liquid monomer as the polymerisation medium or by effecting polymerisation in the gas phase. The polymer obtained by such processes, when removed from the polymerisation reaction vessel, will typically be mixed with unpolymerised, unabsorbed olefin monomer and it is desirable to separate this unabsorbed monomer in a preliminary step before removing the absorbed monomer. This preliminary separation step can be effected using any suitable technique for separating a solid phase from a fluid phase, for example by filtration, centrifuging or preferably by using a cyclone.

The vigorous mechanical agitation is conveniently effected in a vessel having a stirrer blade located near the bottom thereof, the stirrer blade being mounted on the drive shaft of a high speed motor. Any vessel containing a high speed stirrer may be used, for example a Henschel high speed mixer. The agitation should be sufficiently vigorous to cause a rise in the temperature of the polymer. Using a high speed stirrer, the degree of agitation will depend on the capacity of the vessel and the stirrer design but, in general, a sufficiently vigorous agitation is achieved by stirring at 300 rpm up to 10,000 rpm, preferably at least 500 rpm, for a period of time which is conveniently from one minute up to 15 minutes, preferably at least 2 minutes, for example 2 to 5 minutes. The time and degree of agitation are selected to give the desired final temperature.

The olefin polymer from which the olefin monomer has been released contains a reduced level of absorbed monomer and may require no further treatment. However, if this polymer contains an undesirably high level of potentially harmful catalyst residues, then the heated polymer may be passed to a subsequent stage in which the level of potentially harmful residues from the catalyst system is reduced. Since the process of reducing the level, in the polymer, of potentially harmful residues, particularly halogen such as chlorine, is conveniently carried out at an elevated temperature which is at least 60° C., and preferably at least 80° C., it will be appreciated that the process, as hereinbefore described, of removing the absorbed monomer has an additional effect in that it results in the polymer being heated to a temperature suitable for the next stage of treating the polymer.

The monomer, or monomer mixture, which is released and separated from the polymer is preferably cooled and then may be recycled directly to an appropriate stage of the polymerisation sequence. If the monomer is a mixture, this mixture may be recycled to that stage of the polymerisation sequence in which such a monomer mixture is used. Thus, if propylene is polymerised in a first stage, which may be effected in several polymerisation vessels in series, and ethylene is polymerised in the presence of propylene in a second stage, which may also be effected in several polymerisation vessels in series, the monomer separately withdrawn from the vessel will be a mixture of ethylene and propylene and, after cooling, this mixture can be recycled to the second stage of the polymerisation sequence.

If desired, the process of reducing the level, in the polymer, of harmful residues such as halogen may be commenced whilst the polymer is being subjected to the vigorous mechanical agitation. Thus, whilst the polymer is being vigorously agitated mechanically, reagents which are effective to react with the harmful residues, such reagents being, for example, a mixture of propylene oxide and water, are added to the polymer. It will be appreciated that any excess of the added reagents must be removed from the monomer separated from the polymer before this monomer is returned to polymerisation reactor. Shortly after adding the reagents to the mechanically agitated polymer, the polymer is withdrawn from this stage of the process and passed to a subsequent stage in which the treatment of the polymer to reduce the level of harmful catalyst residues is carried to completion, this subsequent stage representing the major portion, typically at least 75%, for example 75% to 95%, of the treatment time required to achieve the desired reduction in the level of harmful catalyst residues.

As an alternative to recycling directly the monomer, or monomer mixture, which is released and separated from the polymer, the monomer or monomer mixture may be subjected to a purification step, for example using a distillation column. This purification step provides a means for removing, from the polymerisation system, materials such as inert diluents, nitrogen and hydrogen, which might otherwise build up to an undesirably high level. Furthermore, a monomer mixture may be separated into its constituent components. From the purification step, the monomer, monomer mixture or separated monomers, can be recycled to an appropriate stage in the polymerisation sequence.

Hence, the procedure of the present invention provides a simple technique for the recovery of absorbed unpolymerised olefin monomer which can be recycled with a minimum of subsequent treatment. Although the polymer obtained still contains some unpolymerised monomer, the quantity of such monomer is typically less than 10% by weight of the quantity of monomer absorbed initially. Thus, after treatment in accordance with the present invention the polymer typically contains less than 0.1% by weight, possibly as little as 0.005% by weight, of absorbed monomer.

It will be appreciated that the process of the present invention forms a part of the work-up procedure in which an olefin polymer is subjected to various treatments after being removed from the polymerisation vessel and before being exposed to the atmosphere.

As a further aspect of the present invention there is provided an apparatus comprising, in combination, an olefin polymerisation reactor, an exit means in said polymerisation reactor, which exit means is adapted to withdraw a reaction mixture containing a particulate olefin polymer from said polymerisation reactor, a vessel containing mechanical means to vigorously agitate a particulate solid, wherein the said vessel is provided with an inlet means, a solid outlet means and a gas outlet means, the said inlet means being adapted to pass into said vessel a particulate solid, and a transfer means from the exit means of the polymerisation reactor to the inlet means of the vessel.

The olefin polymerisation reactor can be any suitable type of reactor and is especially a reactor suitable for effecting polymerisation in the essential absence of a polymerisation inert diluent, such reactors including a liquid monomer polymerisation reactor or a gas-phase polymerisation reactor such as a gas-phase fluidised bed or a gas-phase stirred bed reactor of a known type. The polymerisation reactor may be the final reactor in a series of polymerisation reactors in each of which the same, or different, olefin monomer, or mixture of olefin monomers is polymerised.

The transfer means may be a direct line from the withdrawal means of the polymerisation reactor to the inlet means of the vessel. However, since the polymer from the reactor is typically mixed with unpolymerised, unabsorbed monomer, it is preferred that the transfer means includes means, such as a cyclone, for separating the solid particulate polymer from the unabsorbed monomer.

In order to provide essentially continuous operation, it may be convenient to use at least two vessels in parallel. In this manner, whilst one vessel is being filled with the polymer to be treated, in the other vessel the polymer is first treated and thereafter the treated polymer and the released monomer are removed. However, it will be appreciated that a single vessel may be used by continuously rotating the agitation means, introducing the polymer continuously or intermittently and withdrawing the released monomer and treated polymer also continuously or intermittently. Alternatively, a single vessel may be used by operating in a batch manner with a suitable polymer holding means located in the transfer means between the polymerisation reactor and the vessel. A cyclone and a holding pot in communication with the solids exit of the cyclone can be located in the transfer means and this combination can function as the polymer holding means.

The inlet and outlet means to the vessel may be provided with a sealing means which can be any suitable sealing means such as a valve and the sealing means in the inlet and solid outlet means should be suitable for handling particulate polymers, for example a star feeder, a compression screw or an isolation valve such as a ball valve.

The solid outlet means may be connected to a storage vessel in which the particulate polymer is stored until such time as it is required for use or packing. Alternatively, the polymer may require treatment to reduce harmful catalyst residues and in such a case the solid outlet means is conveniently connected to the inlet of a vessel in which treatment to reduce harmful catalyst residues may be effected. Such a vessel may be an extruder, such as is described in British patent specification No. 1 442 388, a fluidised bed reactor, such as is described in British patent specification No. 1 420 837, a packed bed system such as is described in commonly assigned British patent specification No. 1,560,940. or a stirred bed system.

The gas outlet means in the vessel may be connected to a line which leads directly to the monomer recycle conduit of the polymerisation system. Alternatively, the gas outlet means may be connected to a line which leads to a purification system such as a distillation column, from which at least one line leads directly, or indirectly, to at least one of the polymerisation reactors within the polymerisation system.

Figure 2:
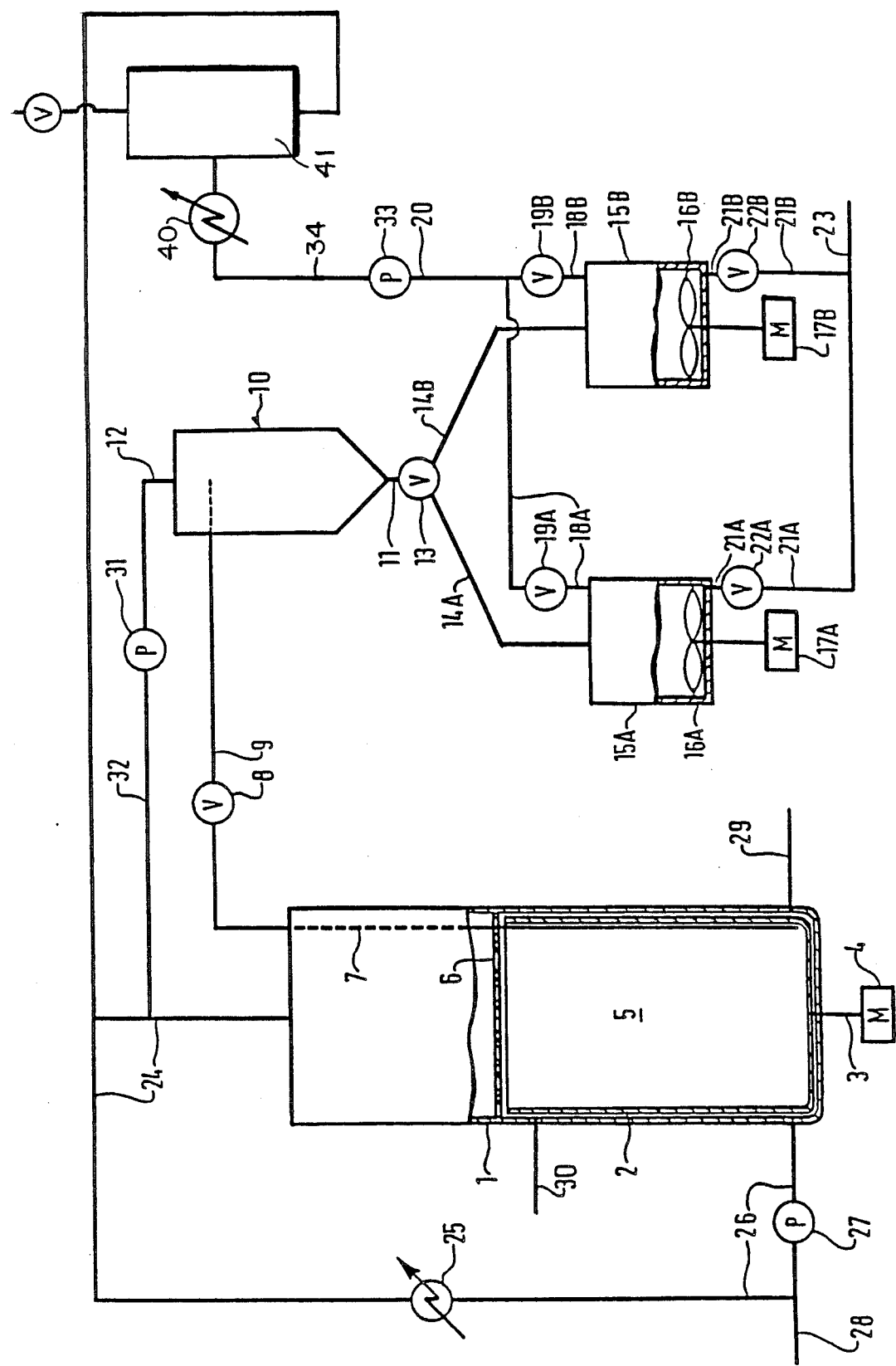

Two embodiments of the present invention will now be described with reference to the accompanying drawing in which FIG. 1 is a diagrammatic representation of a polymerization system including a vessel for the separation of unpolymerized absorbed monomer, and FIG. 2 is similar to FIG. 1 but including equipment for removing harmful catalyst residues.

Referring to the drawing, a polymerisation reaction vessel 1 is provided with an agitator 2 which is mounted on a drive shaft 3 of a motor 4 located beneath the vessel 1. The vessel 1 contains a bed 5 of particles of a propylene polymer containing active polymerisation catalyst, the top of the bed 5 being indicated at 6.

A dip leg 7 passes from the top of the vessel 1 to a point near the bottom of the bed 5. The dip leg 7 is connected to an on/off valve 8, to which is also connected a conduit 9. The conduit 9 passes to the inlet of a cyclone 10, which has a solid outlet conduit 11 and a gas outlet conduit 12. The outlet conduit 11 is connected to a valve 13, to which are also connected two conduits 14A and 14B, the valve 13 being capable of closing the conduit 11 or connecting conduit 11 either to conduit 14A or conduit 14B.

Each of the conduits 14A and 14B is connected to a vessel (15A or 15B respectively) having a stirrer blade (16A or 16B respectively) mounted on the drive shaft of a high speed motor (17A or 17B respectively). Each vessel 15A and 15B is provided with a gas outlet conduit (18A or 18B respectively) which includes an on/off valve (19A or 19B respectively). The conduits 18A and 18B join together to form a gas conduit 20.

Each vessel 15A and 15B is provided with a solid outlet conduit (21A or 21B respectively) and each of these conduits includes and on/off valve (22A or 22B respectively). The conduits 21A and 21B join together to form a conduit 23 which may be connected to a storage vessel (not shown) or means for removing harmful catalyst residues.

At the top of the polymerisation reaction vessel 1 is provided a gas exit conduit 24. The conduit 24 passes to a heat exchanger 25. From the heat exchanger 25, a recycle conduit 26, which includes a pump 27, passes to the base of the vessel 1. Connected to the recycle conduit 26 is a propylene make-up conduit 28. A conduit 29, which is also connected to a supply (not shown) of an organo-aluminium compound, passes to the vessel 1.

A conduit 30 is connected to the vessel 1 at a point below the top 6 of the bed 5. The conduit 30 is also connected to a source (not shown) of a titanium halide-containing component.

The gas outlet conduit 12 from the cyclone 10 is connected to a compressor 31 to which is connected to take-off conduit 32. The conduit 32 leads to the exit conduit 24 from the vessel 1.

The gas conduit 20 is connected to a compressor 33 to which is connected a take-off conduit 34. The conduit 34 leads to the exit conduit 24.

Using the apparatus illustrated, the polymerisation process is effected using conditions known for the polymerisation of propylene in the gas phase. Thus, the pressure in vessel 1 is conveniently in the range from 15 up to 45, preferably from 20 up to 35 kg/cm$^2$ and the temperature is conveniently in the range from 60° C. to 90° C. The recirculating monomer is cooled to from 5° C. to 40° C. in the heat exchanger 25. Make-up propylene is added through the conduit 28.

Diethyl aluminium chloride is added to vessel 1 through the conduit 29 and a suspension of titanium trichloride in liquid propylene is added through the conduit 30. Any liquid propylene passed into the vessel 1 through the conduit 30, and possibly conduit 26, is vaporised under the conditions of temperature and pressure within the vessel 1.

The cyclone 10 is operated at a pressure, typically 1 to 2 atmospheres, which is substantially below that in the vessel 1. The valve 8 is opened intermittently and, when valve 8 is open, a mixture of polymer and monomer passes into the cyclone 10 in which most of the monomer vapour is separated from the polymer and withdrawn through conduit 12 to the compressor 31 and is then recycled directly back to the vessel 1.

The polymer is withdrawn from the cyclone 10 through conduit 11 and the valve 13 which, in normal operation, alternately connects conduit 11 first to conduit 14A and then to conduit 14B. When the polymer passes into the vessel 15A, the stirrer blade 16A is stationary, valve 19A is open and valve 22A is closed. When a sufficient weight of polymer has been charged into the vessel 15A, the valve 13 is rotated to connect with the conduit 14B, and commence the filling of the vessel 15B.

In the vessel 15A, the stirrer blade 16A is rotated and the polymer is thereby heated to the desired temperature. As the temperature rises, the monomer in the polymer becomes less soluble, is released from the polymer and withdrawn and recycled through conduits 18A and 20, compressor 33 and conduit 34. When the desired temperature has been attained, the valve 19A is closed and the valve 22A is opened and, with the stirrer blade 16A still rotating, the polymer is discharged through the conduit 23 to the subsequent parts of the system.

During this sequence, the vessel 15B is being filled and the sequence is then continued in vessel 15B whilst the vessel 15A is being filled again.

It will be realised that there can be numerous variations on the system illustrated and described hereinbefore. Thus, the polymerisation reaction vessel 1 may, alternatively, be a gas-fluidised bed reactor, or a loop reactor or other type of reactor suitable for the polymerisation of a liquid monomer. As a further alternative, one or both of the conduits 32 and 34 is connected to a purification system, for example a distillation column, and the purification system is, in turn, connected to the exit conduit 24 from the vessel. Apparatus including distillation column as illustrated in FIG. 2. From the compressor 33, conduit 34 passes through heat exchanger/condenser 40 in which partial separation of the gas stream into liquid and gas is effected. Further separation is effected by passing to a distillation column 41, from which the liquid propylene is recycled to conduit 24 and back to the polymerization vessel 1. Other variations are possible without departing from the scope of the invention is defined herein.

The invention is further illustrated by the following Example and Comparative Examples.

Polymerisation of propylene and discharge of polymer

Propylene was polymerised in the gas phase at a temperature of 70° C. and a pressure of 28 kg/cm$^2$ absolute. Polymerisation was effected continuously with an average residence time in the reaction vessel of three hours. During the polymerisation, polypropylene polymer was intermittently discharged from the reaction vessel together with some unpolymerised propylene. The discharge was effected by sequentially opening two ball valves which were arranged in series in the polymer discharge line from the reaction vessel. The admixture of polymer and monomer was passed through a cyclone which partially separated the monomer from the polymer. The polymer was removed from the base of the cyclone under the effect of gravity and a slight pressure difference and passed into a collection vessel.

Polymer was removed from the collection vessel by opening a valve in the base of the vessel. Four samples were removed from the collection vessel and treated as set out in the Example and Comparative Examples.

COMPARATIVE EXAMPLE A

A sample of the polymer was placed in a bag formed from polyethylene and the bag was placed in a tin of capacity about 1.5 kg. The tin was sealed and stored at ambient temperature (about 20° C.) for 4 days. The propylene content of the polymer was then determined. The result is shown in the following Table.

COMPARATIVE EXAMPLE B

A sample of the polymer was placed in a jar (nominal capacity about 100 cc) having a screw cap lid. The jar was sealed and placed in a cold chest maintained at −20° C. After storing in the cold chest for 4 days, the propylene content of the polymer was determined and the result is shown in the following Table.

EXAMPLE 1

A sample of polymer which had been stored in a tin for 4 days, in the manner described in Comparative Example A was placed in a high speed mixer of capacity 5 liters at a temperature of 43° C. The stirrer in the mixer was rotated at 3600 rpm without passing any gaseous medium into the mixer. After 14 minutes the temperature of the polymer had risen to 118° C. and the stirrer was stopped. The mixer was opened, a small quantity of the polymer was removed and the propylene content of this polymer was determined.

COMPARATIVE EXAMPLE C

This was a continuation of the procedure of Example 1. After the mixer had been opened at 118° C. and a polymer sample removed, the mixer was sealed, allowed to cool to 43° C., the mixer was then re-opened and a further sample of polymer was removed and the propylene content determined.

COMPARATIVE EXAMPLE D

This was a repeat of Comparative Example C with the exception that the mixer was not opened at 118° C., but was allowed to cool without being opened and a sample of polymer was removed and analysed once the mixer had cooled to 43° C.

In the Example and the Comparative Examples, all stages were effected in an inert atmosphere, in the essential absence of oxygen or oxygen-containing impurities.

TABLE

| Example or Comparative Example | Propylene Content Polymer (a) (wt %) |
| --- | --- |
| A | 0.064 |
| B | 0.131 |
| 1 | 0.005 |
| C | 0.0063 |
| D | 0.023 |

Note to Table
(a) Determined by comparison with standard samples.
(I) Standard Samples - 2 g samples of propylene-free polymer (prepared by fluidising the polymer at 90° C. with nitrogen for 24 hours) were weighed into glass sample tubes of capacity 23 cc containing air. The tubes were sealed with Neoprene caps which were held on by an aluminium sealing ring. Known quantities of propylene were injected, by means of a hypodermic syringe, into the tubes which were then left to equilibriate at ambient temperature for 24 hours. Samples of the gas were extracted by hypodermic syringe and this was analysed. From the quantity of propylene found to be present in the gas, the quantity of propylene in the polymer can be deduced.
(II) Polymer being tested - 2 g samples of the polymer being tested were weighed into sample tubes as described in I). The tubes were sealed and allowed to equilibriate at ambient temperature for 24 hours. A gas sample was then withdrawn and analysed. From the measured quantity of propylene in the gas, and a calibration curve based on the results obtained in (I), the concentration of propylene originally present in the polymer could be deduced.

We claim:
1. Apparatus for removing olefin monomer from olefin polymers comprising, in combination,
a polymerization system including at least one olefin polymerization reactor having an exit means adapted to withdraw a reaction mixture containing a particulate olefin polymer from said polymerization reactor having at least one inlet means for liquid or gaseous olefin monomers and means to maintain the olefin monomer in the gas phase,
a vessel containing mechanical means to vigorously agitate a particulate solid,
inlet means to pass into said vessel a particulate solid,
outlet means in said vessel, transfer means from the exit means of said polymerization reactor to the inlet means of said vessel wherein said transfer means includes means for separating the solid particulate polymer from unabsorbed monomer mixed with the polymer, and
a purification system which is a distillation column wherein the gas outlet means of the vessel is connected to a line which leads to the said purification system from which at least one line is communicated to at least one of the two polymerization reactors within the polymerization system.

* * * * *